(12) United States Patent
Senzaki

(10) Patent No.: US 6,186,712 B1
(45) Date of Patent: Feb. 13, 2001

(54) TOOL HOLDER

(75) Inventor: Chikara Senzaki, Nara (JP)

(73) Assignee: Manyo Tool Kabushiki Kaisha, Mara (JP)

(*) Notice: Under 35 U.S.C. 154(b), the term of this patent shall be extended for 0 days.

(21) Appl. No.: 09/290,480

(22) Filed: Apr. 12, 1999

(30) Foreign Application Priority Data

Jun. 4, 1998 (JP) .................................................. 10-156322
Dec. 3, 1998 (JP) .................................................. 10-344016

(51) Int. Cl.[7] .................................................... B23B 31/02
(52) U.S. Cl. ........................ 409/234; 74/573 R; 279/125; 279/132; 279/157; 408/143; 408/239 R
(58) Field of Search ................................ 409/232, 234; 408/143, 238, 239 R; 279/125, 132, 157; 74/573 R, 574

(56) References Cited

U.S. PATENT DOCUMENTS 4,865,336 * 9/1989 Keritsis ................................. 409/234
5,033,923    7/1991 Osawa .................................. 409/131
5,096,345    3/1992 Toyomoto ............................. 408/239
5,125,777    6/1992 Osawa .................................. 409/234
5,407,308 * 4/1995 Takayoshi ............................ 409/234

FOREIGN PATENT DOCUMENTS

660784 * 5/1979 (RU) .................................... 408/143
95/00576   2/1995 (WO) .

* cited by examiner

Primary Examiner—Daniel W. Howell
(74) Attorney, Agent, or Firm—Graybeal Jackson Haley LLP

(57) ABSTRACT

A tool holder includes a holder body having a first section to be attached to a machine and a second section coaxially exteding from the first section, a ring in which part of the holder body is received, and an assembling device for removably assembling the ring to the holder body. The holder body further has a contacting portion facing the machine side and with which at least part of the ring is brought into contact.

18 Claims, 17 Drawing Sheets

TOOL HOLDER

BACKGROUND OF THE INVENTION

1. Field of the Invention

This invention relates to a holder for a tool such as a tap, an end mill, a drill, an internal cutting tool, or an abrasive grindstone.

2. Prior Art

In machining by a machine tool such as a milling machine, a boring machine, a lathe or a polishing machine, the working accuracy is influenced much by the presence or absence and the magnitude of imbalance in weight, in a circumferential direction, of a rotary shaft (that is, a spindle) of a machine tool, a rotating tool or the like. Therefore, in machining of the type mentioned, it is important to reduce the imbalance of a rotary shaft and a rotating tool as far as possible in order to raise the working accuracy.

As one of tool holders which can adjust a rotary shaft and a rotating tool against imbalance, a tool holder is available wherein a holder body having a first section in the form of a bar to be attached to a machine, a second section in the form of a bar coaxially extending from one end of the first section and a flange provided at a boundary portion between the first and second sections is used and a plurality of threaded holes which are opened toward the side of the second section are formed at intervals in a circumferential direction in the flange while screw members are screwed into one or more of the threaded holes in accordance with a direction of imbalance to be eliminated (U.S. Pat. No. 5,096,345, No. 5,033,923 and No. 5,125,777).

However, with the tool holder described above, since the flange thereof to be gripped by an automatic tool exchanging machine which automatically attaches and removes a tool to and from a machine tool together with the tool holder has threaded holes formed therein, the second section of the holder body makes an obstruction to an operation for forming the threaded holes in the flange, and as a result, it is difficult to form a plurality of threaded holes at angularly equal distances and imbalance in weight occurs with the holder body itself.

As another one of tool holders, a tool holder is available wherein a balance ring for balancing is attached to the flange of the holder body (WO95/26258). With this tool holder, since a recess for receiving the balance ring is opened to the first section side at which the tool holder is attached to a rotary shaft of a machine tool, the first section of the holder body makes an obstruction to an operation for forming such a recess on the flange, and as a result, it is difficult to form such a recess accurately and precisely and imbalance in weight occurs with the holder body itself.

Further, with the second-mentioned conventional tool holder described above, since the balance ring is attached to the attaching side to the rotary shaft, before the tool holder is attached to the rotary shaft, the balance ring must be attached to the tool holder and a screw for balancing must be attached to the balance ring from the rotary shaft side of the machine tool. Accordingly, it is difficult to balance the rotary shaft, and particularly after the tool holder is attached to the rotary shaft, it is very difficult to perform balancing.

SUMMARY OF THE INVENTION

Therefore, in a tool holder, although the balance in weight of the holder body itself is very small, it is important to make it possible to perform balancing in weight of a rotary shaft, the tool and so forth readily in a condition where the holder body is attached to the machine.

A tool holder of the present invention comprises a holder body, a ring for receiving part of the bolder body, and an assembling device for removably assembling the ring to the holder body. The holder body has a first section to be attached to a machine and a second section coaxially extending from the first section. The first section and the second section respectively define one end and the other end of the holder body. The holder body further has a contacting portion with which at least a part of the ring facing the one end side is brought into contact.

The tool holder is attached at the first section thereof to a rotary shaft of a machine such as a machine tool, and a tool is attached to the second section. The ring is attached to the holder body from the other end side and is removably assembled to the holder body by means of the assembling device in a condition where at least a part of the ring comes into contact with the contacting portion of the holder body. Weight imbalance can be eliminated, for example, by disposing a ring corresponding to an imbalance amount to be eliminated on the holder body or by assembling a balancer corresponding to an imbalance amount to be eliminated to the ring.

According to the present invention, since at least part of the ring facing the one end side is brought into contact with the contacting portion of the holder body, the ring is attached stably to the holder body. Further, since the ring can be attached to and removed from the holder body from the other end side, that is, from the tool attaching side in a condition where the holder body is attached to the machine, weight imbalance elimination can be performed readily. Furthermore, since a plurality of threaded holes or recesses for balancer need not to be formed on the flange, the holder body with very small imbalance in weight can be produced readily.

The ring may have an outer peripheral face eccentric with respect to the holder body. With this construction, since the ring itself has imbalance in weight, weight imbalance of the rotary shaft, the tool and so forth can be cancelled by the imbalance in weight of the ring itself, and as a result, by using a ring corresponding to the imbalance amount to be eliminated, balancing in weight can be performed readily over a wide range.

The ring may have a plurality of holes angularly spaced from each other around an axis of the ring, and the holes may be opened at least toward the one end side or an outer periphery side of the ring. In this instance, at least one of balancers can be disposed in the hole. With this arrangement, since the balancer can be disposed at or attached to and removed from the hole from the other end side or the outer periphery side of the ring, balancing can be performed more readily and finely.

Each of the holes may be a threaded hole which extend at least in an axial direction of the holder body. Therefore, a screw can be screwed into the threaded hole and can be held in a condition where an end thereof is pressed against the contacting portion or the bottom of the threaded hole. As a result, loosening of the screw is prevented by a frictional engaging force between the end of the screw and the bottom of the threaded hole or the contacting portion.

Each of the holes may be a threaded hole which extends at least in an axial direction of the holder body and outwardly in a radial direction of the ring in such a manner as to come outwardly in radial directions of the ring toward the one end side. Therefore, even if a centrifugal force which arises from rotation of the tool holder acts upon the screw screwed in a threaded hole, since the centrifugal force acts in a direction in which the screw is moved toward the contacting portion, coming off of the screw from the hole is prevented with certainty.

Each of the holes may be a threaded hole which extends at least in an axial direction of the holder body such that the axis thereof has an angle with respect to imaginary lines which pass the axis of the holder body and the center in longitudinal direction of the hole so that a portion thereof adjacent to the one end may not come inwardly in radial direction of the ring with respect to a portion thereof adjacent to the other end. Therefore, even if a centrifugal force which arises from rotation of the tool holder acts upon a screw screwed in a threaded hole, since the centrifugal force does not act in a direction in which the screw is removed from the threaded hole, coming off of the screw from the hole is prevented with certainty. Further, since the threaded hole is opened at locations away from the second section, the second section does not make an obstacle to screwing operation of the screws into the threaded holes, and the screw can be attached to and removed from the threaded hole readily. Accordingly, fine balancing in weight is further facilitated.

The balancer may be a screw itself screwed into a threaded hole or may be another member assembled to the ring by means of a screw screwed into the threaded hole. However, in the latter case, since it is possible to prepare many kinds of balancers having different weights from one another and select, from among them, a balancer corresponding to the imbalance amount to be eliminated, balancing in weight can be performed finely and readily over a wide range in comparison with the former case.

The ring may include a ring body having a plurality of holes opening in an outer peripheral face thereof and angularly spaced from each other in a circumferential direction, and a ring-shaped cover for receiving the ring body so as to close the holes so that they may be opened. In the tool holder which employs such a ring as just described, balancing in weight may be performed, for example, by using a ring body and a cover corresponding to the imbalance amount to be eliminated or by arranging a balancer corresponding to the imbalance amount to be eliminated in at least one of the holes. In both cases, in a condition where the bolder body is attached to the machine, the ring can be attached to and removed from the holder body from the other end side, that is, from the tool attaching side, and the balancer can be attached to and removed from the hole from the outer periphery side of the ring body. Consequently, balancing in weight can be performed readily.

In the tool holder described above, at least a part of the ring body or the cover of the ring is brought into contact with the contacting portion. Consequently, since at least part of the ring body or the cover which is directed to the one end side is brought into contact with the contacting portion of the holder body, the ring is attached stably to the holder body.

The cover mentioned above may have one or more openings which are selectively positioned at a position at which at least the hole or the holes are opened and another position at which the holes are closed up by angularly rotating the ring body and the cover relative to each other. Therefore, in a condition where the hole and the opening are opposed to each other, by disposing or removing a balancer in or from the hole, the hole where a balancer is to be disposed can be changed or selected. Consequently, balancing can be performed more readily and finely.

In the tool holder of the present invention, the ring may have a circular through-hole through which the holder body extends and which has an inner face area whose diametrical dimension decreases toward the one end side, and the assembling device may include a fastener disposed between an outer face area of the holder body and the inner face area of the ring and having an outer face area fitted with the inner face area of the ring, and a plurality of screws for removably attaching the fastener to the holder body. Therfore, the ring can be attached to and removed from the holder body from the other end side, and the second section does not make an obstacle to attachment and removal of the ring to and from the holder body. Accordingly, attachment and removal of the ring to and from the holder body is further facilitated.

The screw may extend through the fastener and be screwed in the holder body such that the axis thereof approach the axis of the holder body toward the one end side. Therefore, since the ring can be attached to and removed from the holder body without being influenced by the second section, attachment and removal of the ring to and from the holder body is further facilitated.

Another tool holder of the present invention comprises a holder body, and a ring unexchangeably disposed on the holder body. The holder body has a first section to be attached to a machine, and a second section coaxially extending from the first section. The first section and the second section respectively define one end and the other end of the holder body. The ring has a plurality of holes spaced angularly from each other around an axis of the holder body. The hole is opened at least toward the other end side or an outer periphery side of the ring and extends at least in an axial direction of the holder body and outwardly in radial directions of the ring in such a manner as to come outwardly in the radial directions of the ring toward the one end side. With this tool holder, since a balancer can be disposed into one or more of the holes from the other end side or the outer periphery side of the ring in a condition where the holder body is attached to a machine, balancing in weight can be performed readily over a wide range. Further, since the ring is unexchangeable from the holder body, the ring is stabilized on the holder body. Furthermore, even if a centrifugal force which arises from rotation of the tool holder acts upon the balancer disposed in the hole, since the centrifugal force acts in a direction in which the balancer is moved outwardly in a radial direction, coming off of the balancer from the hole is prevented with certainty.

A further tool holder of the present invention comprises a holder body, and a ring unexchangeably disposed on the holder body. The holder body has a first section to be attached to a machine, and a second section coaxially extends from one end of the first section. The first section and the second section respectively define one end and the other end of the holder body. The ring has a plurality of holes spaced angularly from each other around an axis of the holder body, each of the holes being opened at least toward the other end side or outer periphery side of the ring and extending at least in an axial direction of the ring such that axis thereof have an angle with respect to an imaginary line which passes the axis of the holder body and the center in longitudinal direction of the hole so that portion thereof adjacent to the one end may not come inwardly in radial direction of the ring with respect to a portion thereof adjacent to the other end. With this tool holder, since a balancer can be disposed into one or more of the holes from the other end side or the outer periphery side of the ring in a condition where the holder body is attached to a machine, balancing in weight can be performed readily over a wide range. Further, since the ring is unexchangeable from the holder body, the ring is stabilized on the holder body.

Furthermore, even if a centrifugal force which arises from rotation of the tool holder acts upon the balancer disposed in the hole, since the centrifugal force acts in a direction in which the balancer is moved outwardly in a radial direction, coming off of the balancer from the hole is prevented with certainty.

DETAILED DESCRIPTION OF THE PREFERRED EMBODIMENTS

Figure 1:
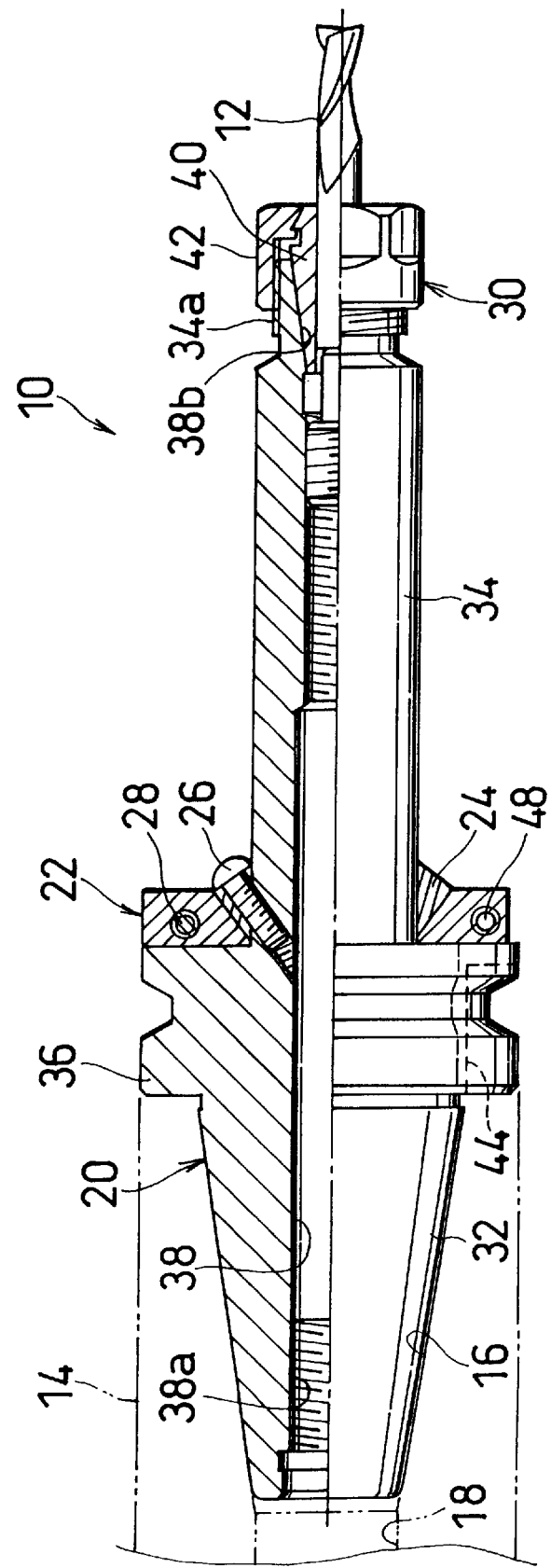
FIG. 1 is a front elevational view partly in section showing a first embodiment of a tool holder according to the present invention.

Referring to FIG. 1, a tool holder 10 is used as a collet chuck for attaching a rotating tool 12 to a rotary shaft 14 of a machine tool. While the rotating tool 12 is, in the example shown, an end mill, it may be any other rotating tool such as a boring bar, a tap, a drill, or a polishing grindstone. The rotary shaft 14 has a hole 16 which is opened to one end face thereof to allow the tool holder 10 to be removably attached, and a hole 18 coaxially communicating to the hole 16. The hole 16 has a truncated conical shape whose diametrical dimension increases toward the end face side of the rotary shaft 14.

The tool holder 10 includes a holder body 20, a balance ring 22 disposed on the holder body 20, a ring-like fastener 24 for removably assembling the ring 22 to the holder body 20, a plurality of screws 26 for removably assembling the fastener 24 to the holder body 20, one or more balancers 28 disposed on the balance ring 22, and a chuck 30 for removably assembling the rotating tool 12 to the holder body 20. The balancers 28 are, in the example shown, screws.

The holder body 20 is inserted at a first section (shank section) 32 thereof in the hole 16 of the rotary shaft 14 and has the tool 12 attached to a second section (tool attaching section) 34 thereof which coaxially extends to the first section 32, and further has a flange 36 at a boundary portion between the first and second sections 32 and 34. The first section 32 has a truncated conical shape similar to that of the hole 16. The first sectin 32 and the second section 34 respectivelly define one end and the other end of the holder body 20.

The holder body 20 has a through-hole 38 extending therethrough in its axial direction. A portion of the through-hole 38 on the first section 32 side is formed as a threaded hole 38a, and an end portion of the through-hole 38 on the second section 34 side is formed as a truncated conical hole 38b whose diametrical dimension increases towards the end face side of the holder body 20. A plurality of threaded holes into which the screws 26 are to be screwed are formed in an angularly spaced relationship from each other around the axis on the holder body 20.

The chuck 30 has a collet (that is, sleeve) 40 for being inserted into the truncated conical hole 38b to grip the rotating tool 12, and a lock nut 42 for being screwed onto a threaded portion 34a formed at an end portion of the second section 34 on the tool attaching side to push the collet 40 into the hole 38b. An outer peripheral face of the collet 40 is formed in a truncated conical shape such that the diametrical dimension thereof decreases toward the interior side of the hole 38b so that the collet 40 may fit for the hole 38b.

The flange 36 has a plurality of recesses 44 for receiving a projection (drive key) of the rotary shaft 14 for receiving rotation of the rotary shaft 14. The recesses 44 are opened toward the first section 32 side and the outer periphery side. The first and second sections 32 and 34 and the flange 36 may be formed as a unitary member or may be produced as separate members from each other and assembled together fixedly. The flange 36 is, in the example shown, a gripping flange to be gripped by an automatic tool exchanging machine, and acts as a contacting portion with which the ring comes into contact.

As shown in FIGS. 1 to 4, the ring 22 has a shape of an annular disk having a center hole coaxial with the holder body 20, that is, a through-hole 46, and has a plurality of holes 48 spaced angularly from each other around the through-hole 46. An outer periphery of the ring 22 is eccentric by e in one of diametrical directions with respect to the through-hole 46. Consequently, the center of gravity of the ring 22 is eccentric toward one side. The holes 48 are, in the example shown, threaded holes.

A portion of the through-hole 46 adjacent to one face of the balance ring 22 forms an inner circumferential face 46a of a truncated conical shape whose diametrical dimension gradually decreases from the one face side to the other face side. The smallest portion of the through-hole 46 has a diametrical dimension substantially equal to the diametrical dimension of a portion of the second section 34 adjacent to the flange 36 side.

Each of the holes, that is, threaded holes 48, extends in an axial direction and outwardly of the ring 22 such that the portion of the ring 22 adjacent to the one face may be positioned outwardly in a radial direction of the ring with respect to another portion adjacent to the other face, and extends through the ring 22 in the direction of the thickness of the ring 22.

Figure 5:
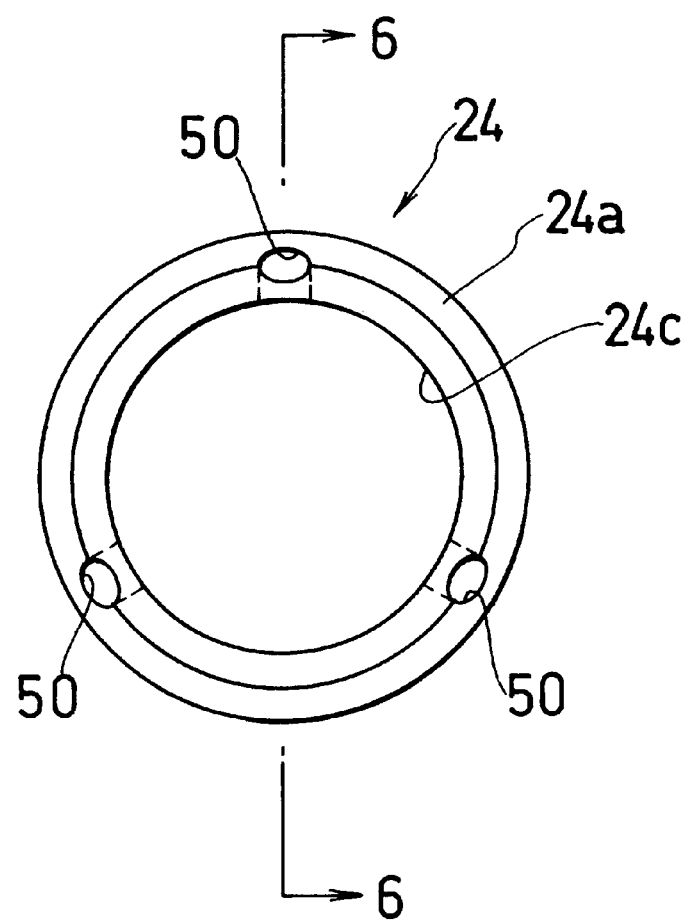
FIG. 5 is a view showing an embodiment of a fastener.
Figure 6:
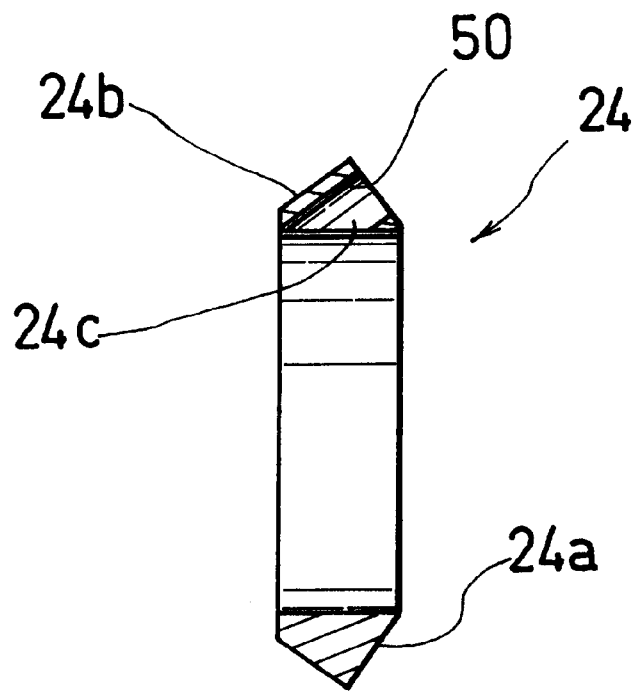
FIG. 6 is a sectional view taken along line 6—6 of FIG. 5.

As shown in FIGS. 1, 5 and 6, the fastener 24 has a first outer circumferential face 24a of a truncated conical shape whose diametrical dimension gradually increases from one face of the ring 22 in an axial direction toward the center in the axial direction, a second outer circumferential face 24b of a truncated conical shape whose diametrical dimension gradually decreases from the center of the axial direction toward the other end in the axial direction, and an inner circumferential face 24c whose diametrical dimension is substantially equal to that of the second section 34. The shape of the second outer circumferential face 24b is substantially the same as the shape of the inner circumferential face 46a of the ring 22.

The fastener 24 further has through-holes 50, which extend from the first outer circumferential face 24a to the inner circumferential face 24c, at equal angular distances around the axis. The through-holes 50 extend perpendicularly to the first outer circumferential face 24a.

Figure 7:
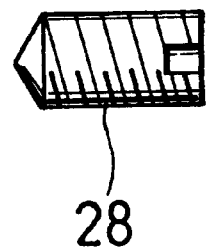
FIG. 7 is a view showing an embodiment of a balancing screw.

As shown in FIG. 7, each of the balancers 28 is a fastening screw having no head portion and having a conical end portion.

Figure 2:
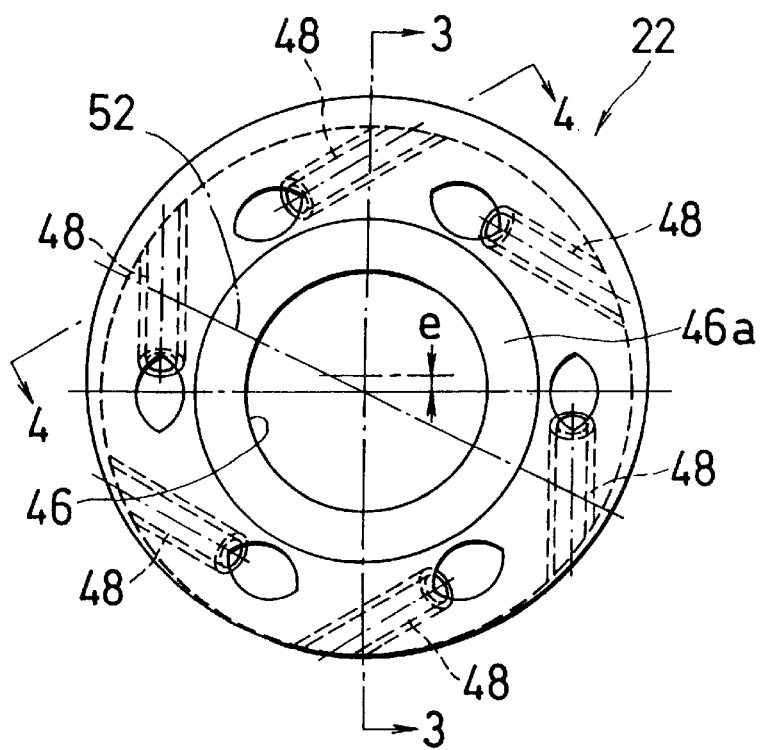
FIG. 2 is a view showing a first embodiment of a balance ring.
Figure 3:
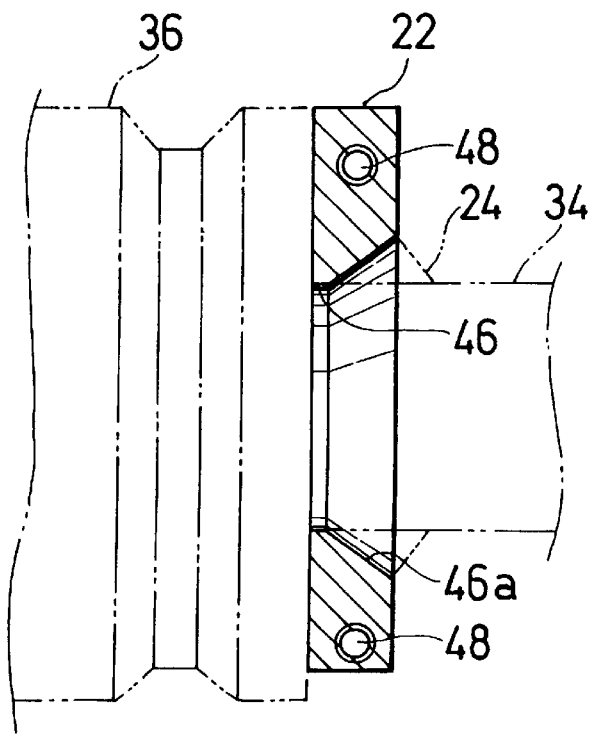
FIG. 3 is a sectional view taken along line 3—3 of FIG. 2.

In a machining site, a plurality of rings 22 having different eccentricity amounts e (that is, adjustable imbalance amounts) are prepared in advance, and a ring 22 whose eccentricity amount e is zero as indicated by a broken line in FIG. 2 is prepared. Further, a plurality of balancers 28 having different weights (that is, adjustable imbalance amounts) are prepared. The weight of each of the balancers 28 can be set to a suitable value by varying the material, the lengthwise dimension or the like of the balancer 28.

When actually used, a ring 22 having a predetermined eccentricity amount and one or more balancers 28 having predetermined weights are selected in accordance with an imbalance amount to be compensated for, and the predetermined balancers 28 are screwed into the threaded holes 48 of the ring 22. However, if the imbalance amount is known, then a ring 22 having a predetermined eccentricity amount e and a screw 28 having a predetermined weight may be prepared.

When used, in a condition where the holder body 20 is attached to the rotary shaft 14 and the tool 12 is attached to the holder body 20, the rotary shaft 14 is rotated first, and during rotation of the rotary shaft 14, the direction of the imbalance and the imbalance amount are measured.

Then, a ring 22 having an eccentricity amount e corresponding to the measured imbalance amount is attached to the second section 34 from the chuck 30 side to a condition where the inner circumferential face 46a faces the chuck 30, and the fastener 24 is attached to the second section 34 from the chuck 30 side to a condition where the outer circumferential face 24a faces the chuck 30.

Then, a plurality of screws 26 are screwed into the threaded holes of the holder body 20, and the fastener 24 is fastened to the holder body 20 by means of the screws 26. In this instance, the fastener 24 is fastened loosely to such a degree that, while the ring 22 can be rotated manually relative to the holder body 20, the ring 22 is not rotated by its own weight or vibrations or the like relative to the holder body 20.

Then, the eccentric direction of the ring 22 is adjusted in accordance with the direction of the imbalance to be eliminated, and then, the screws 26 are screwed further into the threaded holes of the holder body 20. In this instance, since the screws 26 have angles with respect to the axis of the holder body 20, the fastener 24 is moved toward the flange 36 by the screws 26.

As a result of the foregoing, since the fastener 24 pushes the ring 22 in a condition where the outer circumferential face 24b thereof is in contact with the inner circumferential face 46a of the ring 22, the ring 22 is pushed strongly by the flange 36 and the inner circumferential face 46a is pressed strongly by the second outer circumferential face 24b so that the ring 22 is fastened firmly to the holder body 20.

Then, one or more screws 28 having predetermined weights are screwed into a predetermined one or ones of the holes 48. The screws 28 are screwed until ends thereof are pressed against the flange 36. An operation of screwing the screws 28 into the holes 48 may be performed before the ring 22 is attached to the holder body 20.

However, if the screws 28 are screwed into the holes 48 after the ring 22 is attached firmly to the holder body 20, the rotary shaft 14 can be rotated again to measure the direction and the amount of the imbalance to be eliminated in a condition where the ring 22 is attached firmly to the holder body 20.

Also, when it becomes necessary to re-adjust the balance during machining, such as when the tool 12 is exchanged, it is possible to measure the direction and the amount of the imbalance again and perform variation of an attaching condition of the ring 22, exchange of the ring 22, variation of the screws 28, variation of the holes 48 into which the balancers 28 are to be screwed, or the like.

When the tool holder 10, rotating tool 12, balance ring 22 and so forth are to be returned to their original conditions, the operations reverse to those described above should be performed.

With the tool holder 10, since the ring 22 can be attached to and removed from the holder body 20 from the chuck 30 side and the screw 26 can be operated from the chuck 30 side, attaching and removing operations of the ring 22 to and from the holder body 20 are easy. Similarly, since the screws 28 can be operated from the chuck 30 side, attaching and removing operations of the screws 28 to and from the holes 48 are easy.

Further, since the inner circumferential face 46a of the ring 22 and the outer circumferential face 24b of the fastener 24 have truncated conical shapes corresponding to each other and the fastener 24 is displaced in an axial direction of the tool holder 10 in accordance with the screwed amounts of the screws 26, the ring 22 can frictionally engage with the flange 36 and the fastener 24 to temporarily fasten the fastener 24 to such a degree as the ring 22 is not rotated relative to the holder body 20 by its own weight or vibrations, and as a result, a positioning operation of the ring 22 with respect to the holder body 20 is facilitated.

In a condition where the ring 22 is attached firmly to the holder body 20, the tool holder 10 is rotated at a high speed by the rotary shaft 14. Consequently, a centrifugal force acts upon the screws. However, since the threaded holes 48 of the tool holder 10 extend in an axial direction of the ring 22 and outwardly such that portions thereof adjacent to the one face of the ring 22 are positioned outwardly in radial directions of the ring with respect to other portions thereof adjacent to the other face of the ring 22, the centrifugal force acts so that the balancing screws 28 may be moved to the further interiors of the holes 48, but does not act in directions in which the balancers 28 are removed from the holes 48.

It is to be noted that, in place of the formation of the holes 48 as threaded holes which extend in an axial direction of the ring 22 and outwardly such that portions thereof adjacent to one face of the ring 22 may be outwardly in radial directions of the ring with respect to other portions thereof adjacent to the other face of the ring 22, each of the holes 48 may be formed as a threaded hole which extends at least in an axial direction of the balance ring 22 while the axis of the threaded hole 48 has a predetermined angle (for example, an angle of 90° or larger) to an imaginary line 52 which passes the axis of the holder body 20 and the center in a longitudinal direction of the threaded hole 48 so that a portion thereof adjacent to one face of the ring 22 may not be inwardly in a radial direction of the ring with respect to another portion thereof adjacent to the other face of the ring 22.

Also with such a threaded hole as described above, since a threaded hole portion thereof adjacent to one face of the ring 22 is not inwardly in a radial direction of the ring with respect to another threaded hole portion thereof adjacent to the other face of the ring 22, the centrifugal force produced during rotation of the tool holder 10 does not act in a direction in which the balancing screws 28 are removed from the threaded holes 48.

Figure 8:
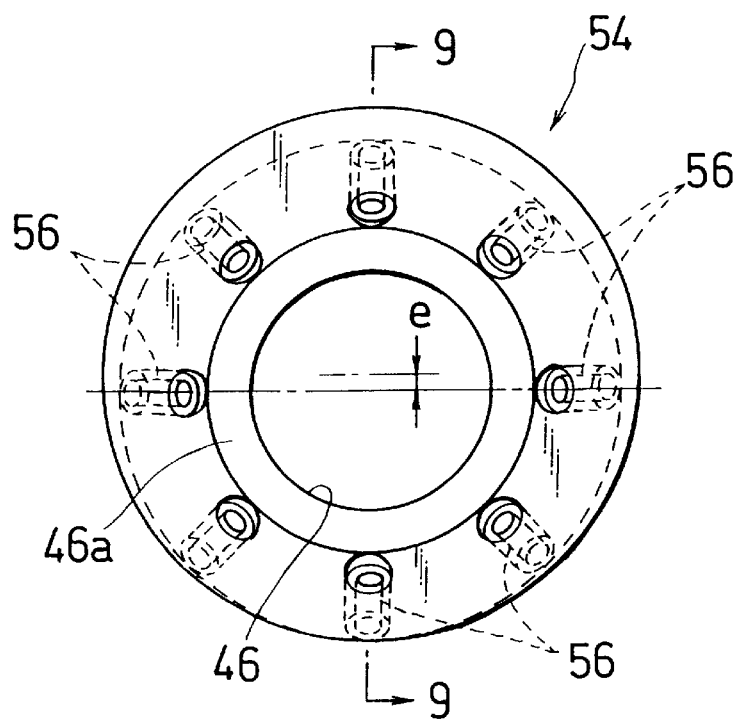
FIG. 8 is a view showing a second embodiment of a balance ring.
Figure 9:
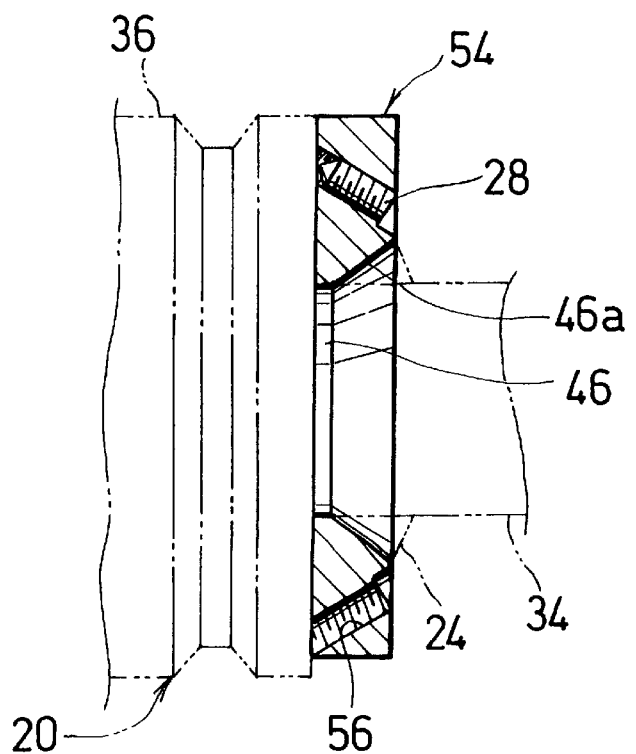
FIG. 9 is a sectional view taken along line 9—9 of FIG. 8.

Referring to FIGS. 8 and 9, balancing holes of a balance ring 54, that is, threaded holes 56 extend at least in an axial direction of the holder body 20 and outwardly in radial directions of the ring 54 so that they may come outwardly in radial directions of the ring 54 toward the flange 36.

In this balance ring 54, even if a centrifugal force which arises from rotation of the tool holder 10 acts upon the balancing screws screwed into the threaded holes 56, since the centrifugal force acts in a direction in which the screws are moved toward the flange, coming off of the balancing screws from the threaded holes 56 is prevented with certainty.

Figure 10:
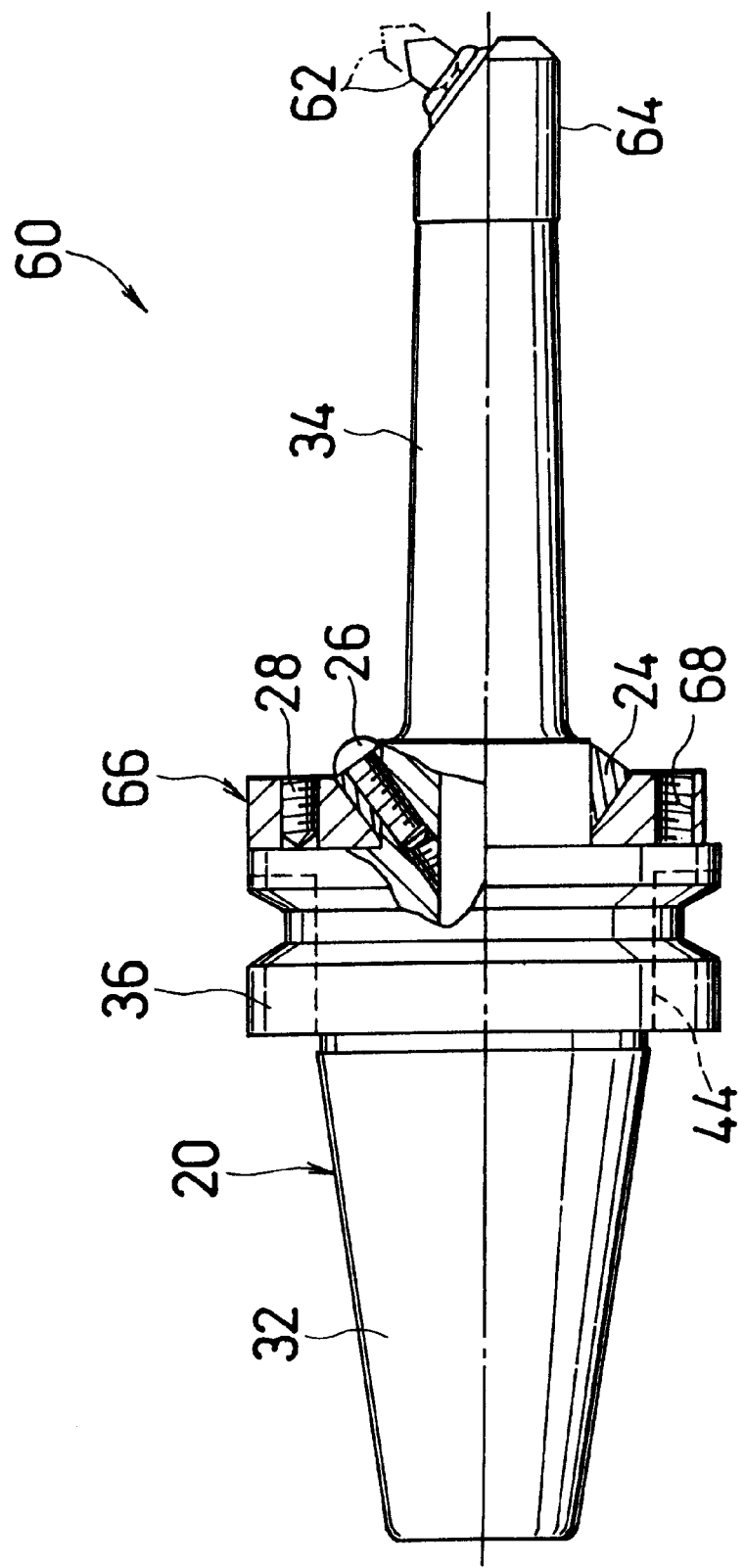
FIG. 10 is a front elevational view partly in section showing a second embodiment of a tool holder.
Figure 11:
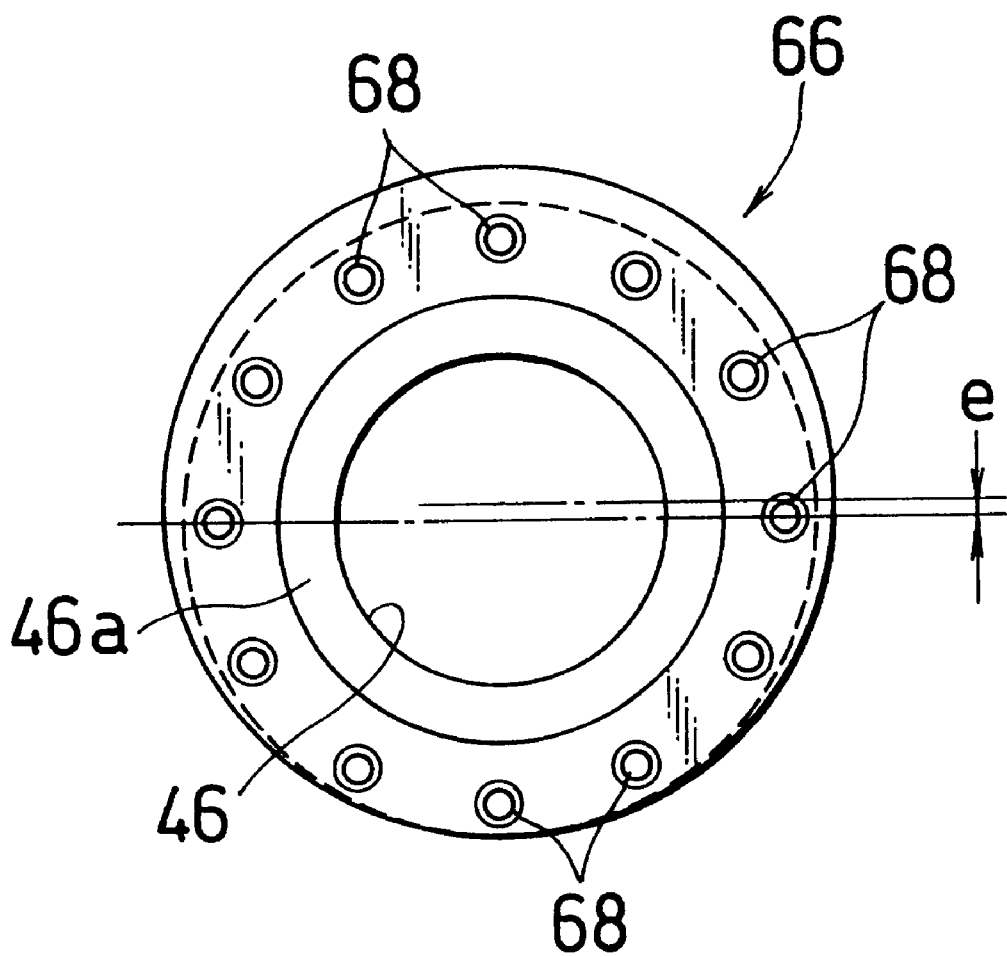
FIG. 11 is a view showing a third embodiment of a balance ring.

Referring to FIGS. 10 and 11, a tool holder 60 is used as a boring bar to which a boring head 64 having a cutting tool 62 is attached. The amount over which the cutting tool 62 extends from the head 64 is adjusted in accordance with a diametrical dimension of a hole to be formed. Balncing holes of the ring 66, that is, threaded holes 68, extend in an axial direction of the holder body 20 through the ring 66.

With this ring 66, even if a centrifugal force arising from rotation of the tool holder 60 acts upon the balancing screws 28 screwed into the threaded holes 68, since the centrifugal force does not act so that the balancers 28 may be moved toward the threaded holes 68, coming off of the balancers 28 from the threaded holes 68 is prevented with certainty.

Figure 12:
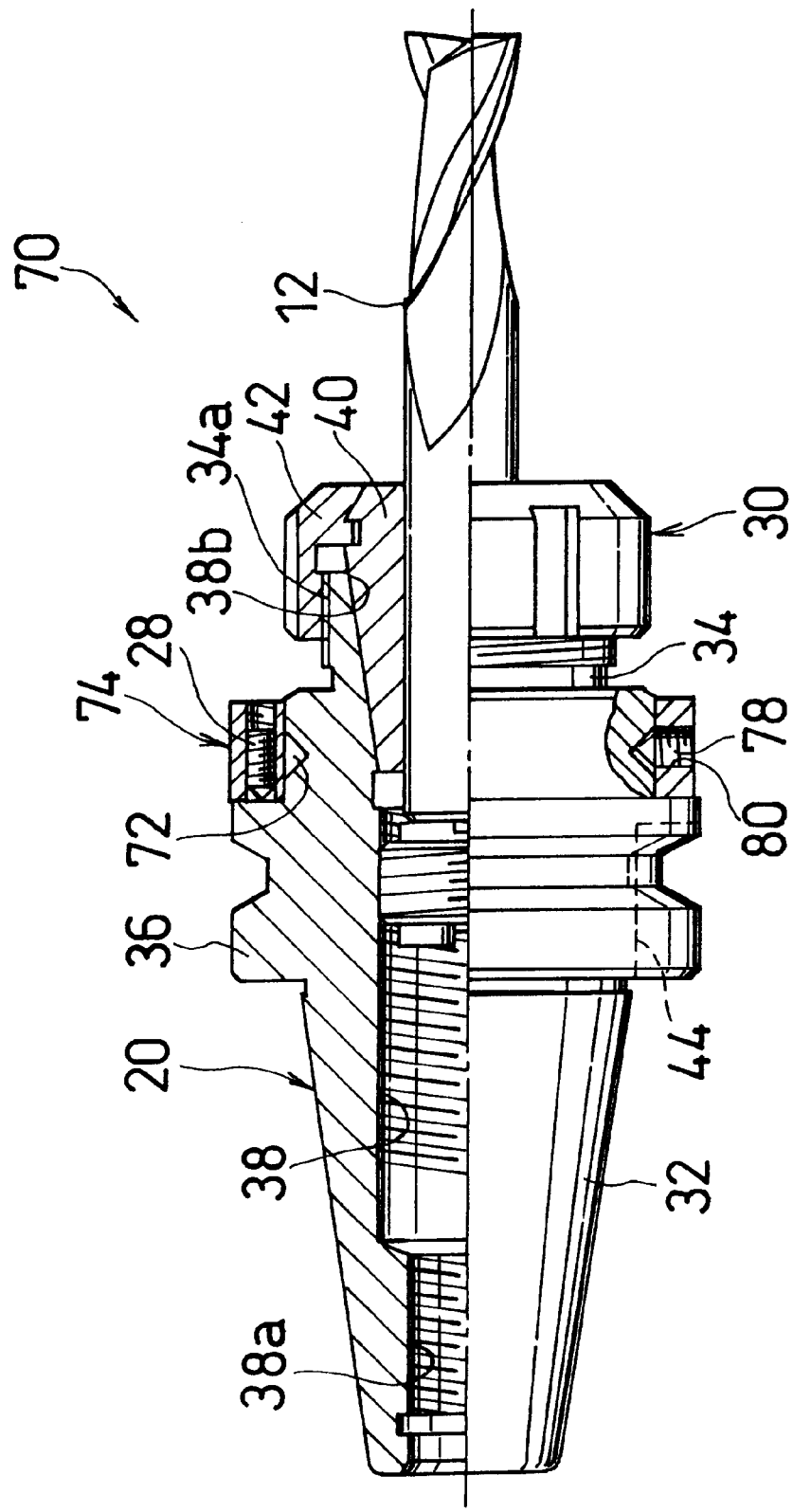
FIG. 12 is a front elevational view partly in section showing a third embodiment of a tool holder.
Figure 13:
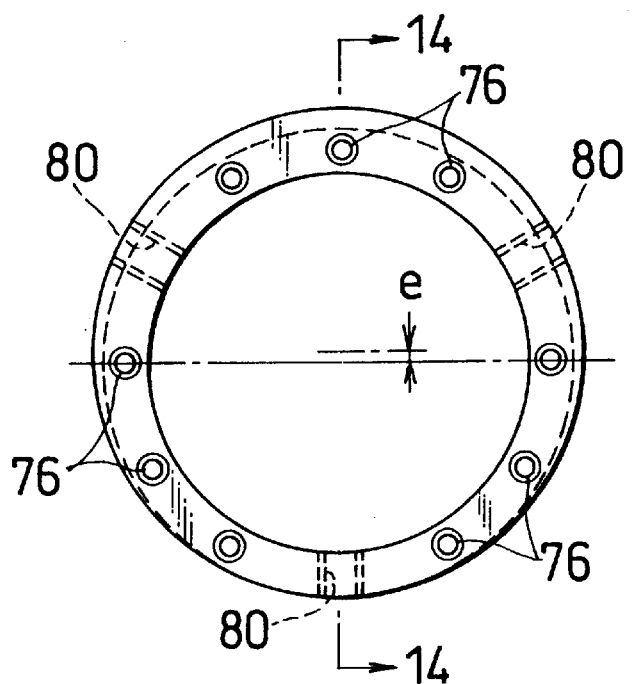
FIG. 13 is a view showing a fourth embodiment of a balance ring.
Figure 14:
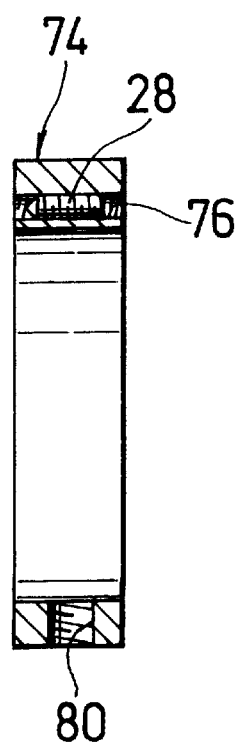
FIG. 14 is a sectional view taken along line 14–14 of FIG. 13.

Referring to FIGS. 12, 13 and 14, a tool holder 70 has a small difference in diametrical dimension between the flange 36 of the holder body 20 and the ring attaching portion. Therefore, the tool holder 70 has a groove 72 of a V-shaped section formed on an outer periphery of the ring attaching portion. The groove 72 extends continuously in a circumferential direction on the ring attaching portion.

A ring 74 has, in addition to a plurality of threaded holes 76 for the balancers 28, a plurality of threaded holes 80 for fastening screws 78 for attaching the ring 74 to the holder body 20. The fastening screws 78 extend through the ring 74 in its axial direction. On the other hand, the threaded holes 80 extend through the ring 74 in radial directions. Each of the fastening screws 78 has a conical end portion.

The ring 74 is attached to the holder body 20 by screwing the fastening screws 78 into the threaded holes 80 in a condition where the eccentric direction thereof is made to coincide with the direction of the imbalance of the tool holder 70.

Figure 15:
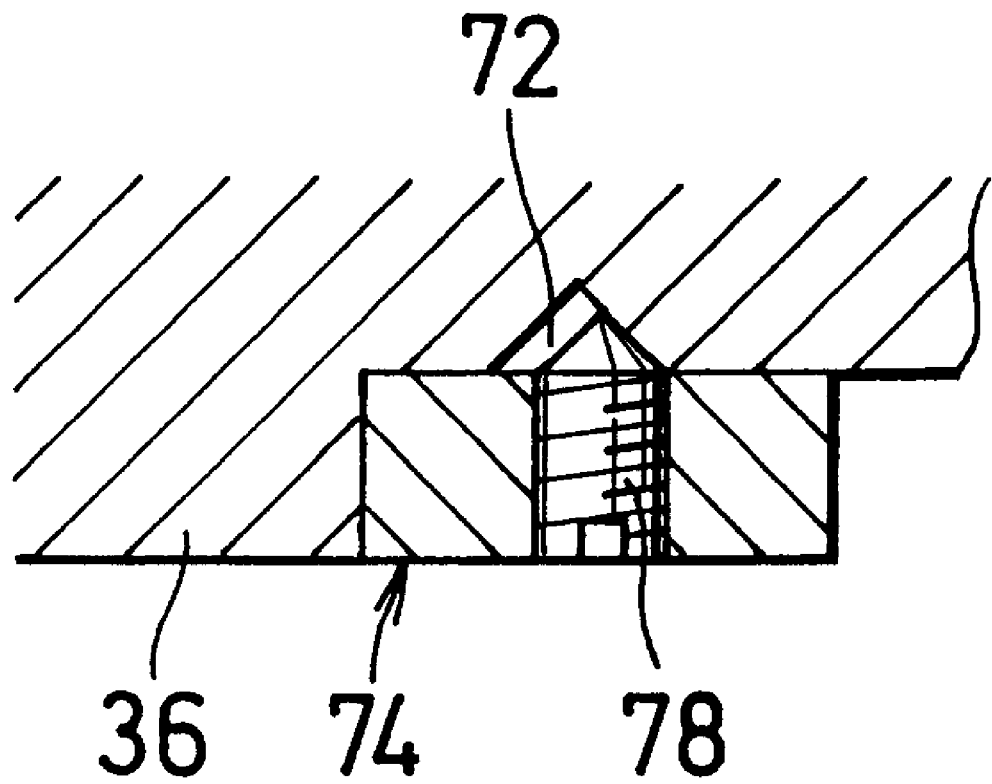
FIG. 15 is a view for explaining a relationship between a V-shaped groove of a tool holder shown in FIG. 13 and a fastening screw.

With the tool holder 70, since an end of each of the fastening screws 78 is pressed against a portion of a V-shaped face forming the groove 72 which is remote from the flange 36 as shown in FIG. 15, the deeper the fastening screws 78 are screwed into the threaded holes 80, the more the ring 74 is pressed against the flange 36 and coming off of the ring 74 from the holder body 20 is prevented.

While, in the embodiments described above, an imbalance in weight is formed on a ring itself, an imbalance in weight may not be formed on a ring itself by forming a ring such that an outer peripheral face thereof has a coaxial shape with a through-hole therein as indicated by broken lines in FIGS. 2, 8, 11 and 13. Further, in place of using a ring formed from a single disk, a ring formed from a plurality of members may be used.

In place of bringing a balance ring into contact with a flange for gripping, the balance ring may be brought into contact with another face (contacting portion) formed on the holder body which crosses with the axis of the holder body and is directed to the tool attaching portion side, or may be brought into contact with any contacting portion other than the gripping flange. Any of such contacting portions may be provided in the proximity of the boundary between the first and second sections or at some other locations.

Further, in place of opening threaded holes for balancer in both faces of a ring, the threaded holes may be opened only toward the collect chuck side so that they may be threaded holes which do not extend through the ring, or ordinary holes may be used in place of the threaded holes. In the latter case, the balancer is disposed fixedly by shrinkage fitting or the like.

Furthermore, in place of using a screw as a balancer, some other balancer disposed in a hole may be used, or a ring-shaped balancer assembled to a ring by means of a screw threaded in a threaded hole may be used.

Referring to FIGS. 16 to 20, a tool holder 90 uses a ring 92 which is a combination of two members. The ring 92 includes a ring body 94 in the form of a disk, and a ring-shaped cover 96 in which the ring body 94 is received. The ring body 94 has a plurality of holes 98 which are opened in an outer peripheral face of the ring body 94 and are spaced angularly from each other in a circumferential direction.

The cover 96 receives the ring body 94 to close the holes 98 so that they may be opened. The cover 96 has one or more openings 100 in order to open and close the holes 98. In the example shown, the openings 100 are formed at three locations spaced by an equal angular distance from each other around an axis of the ring 92.

In the one or more holes 98, balancers 102 and coil springs 104 for energizing the balance ring 92 toward the cover 96 are disposed. While the balancers 102 in the example shown are spheres, some other members such as bar-like members may be used.

Figure 16:
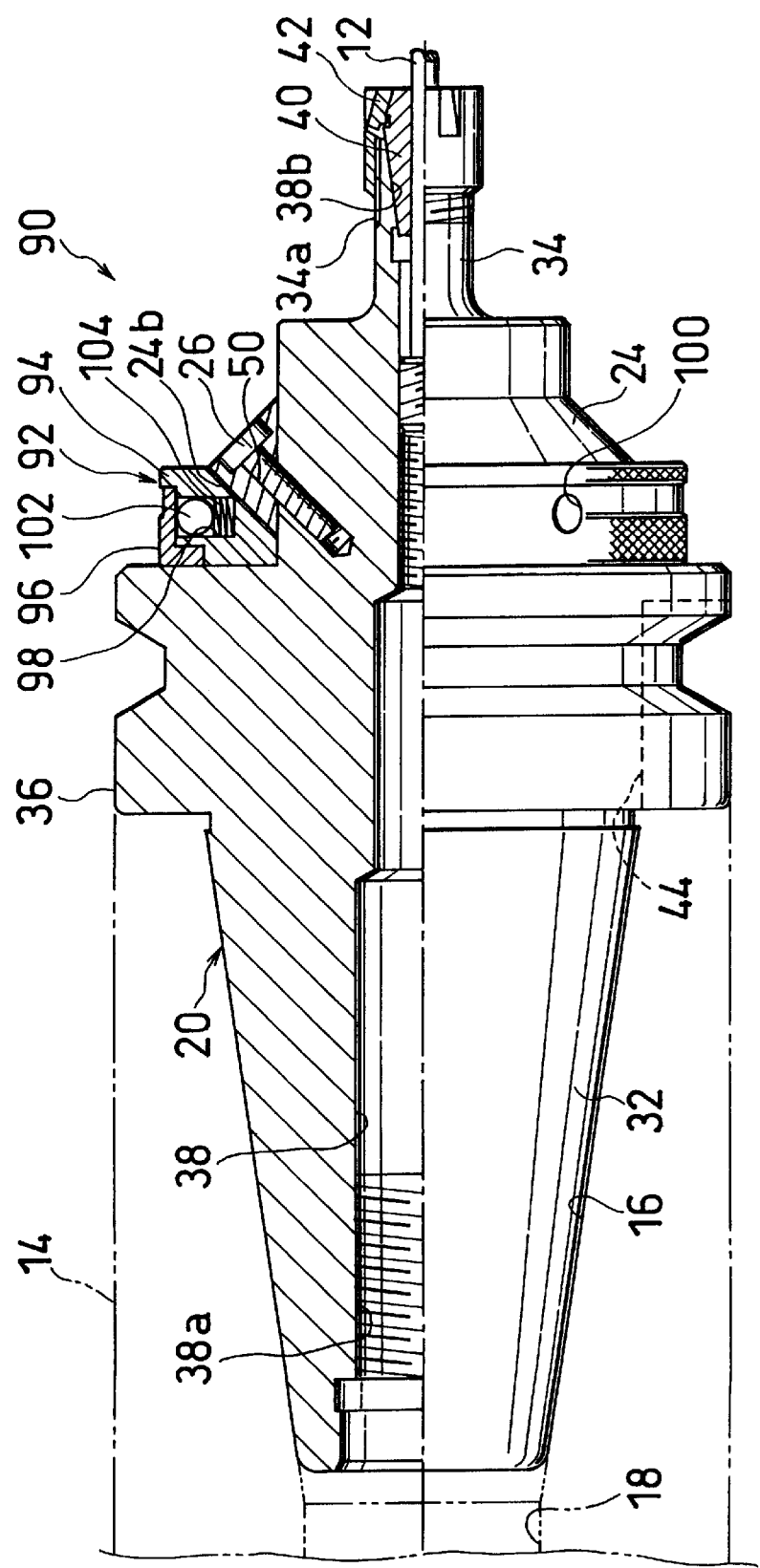
FIG. 16 is a front elevational view partly in section showing a fourth embodiment of a tool holder.
Figure 17:
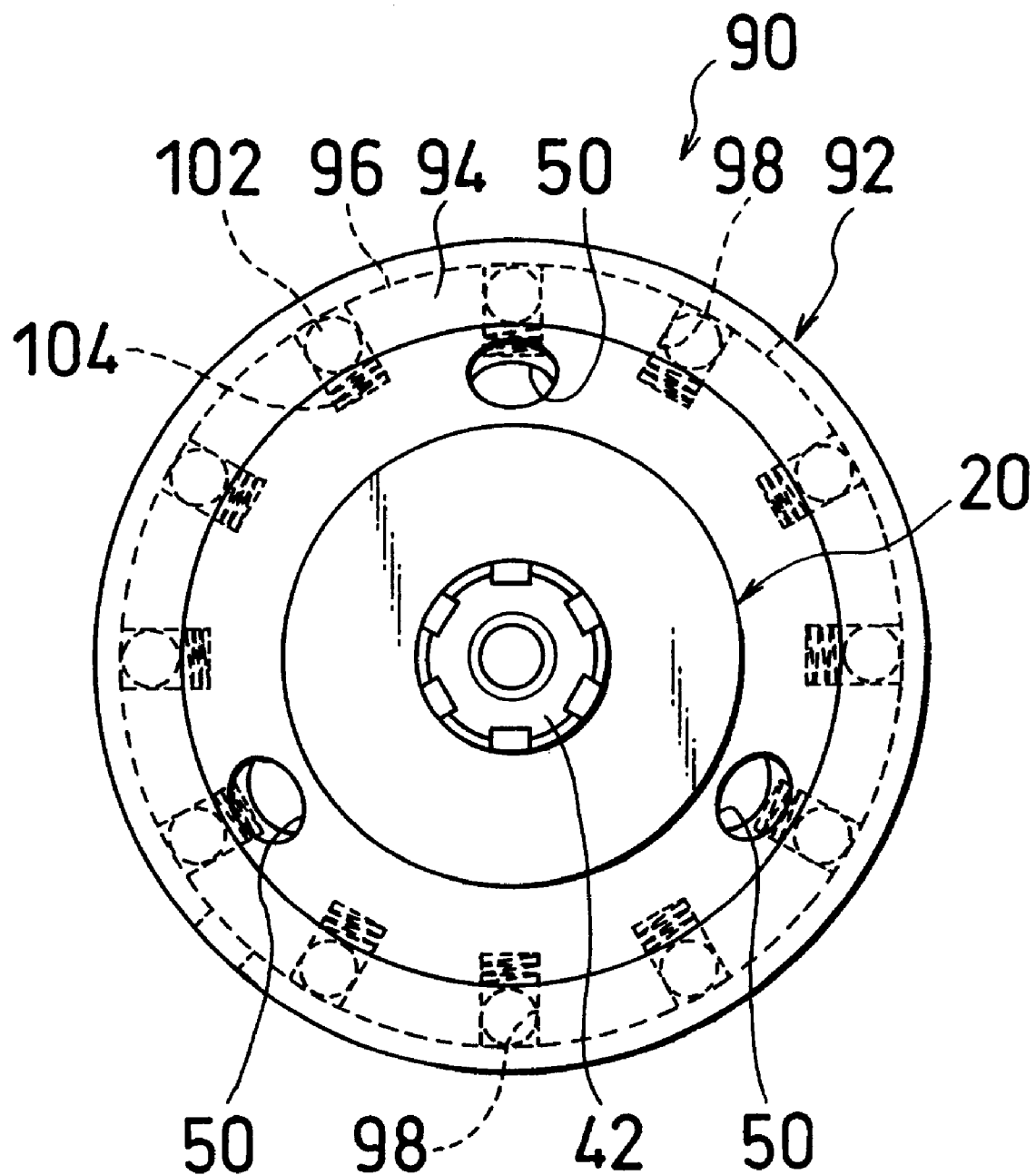
FIG. 17 is a right-hand side elevational view of the tool holder shown in FIG. 16.
Figure 18:
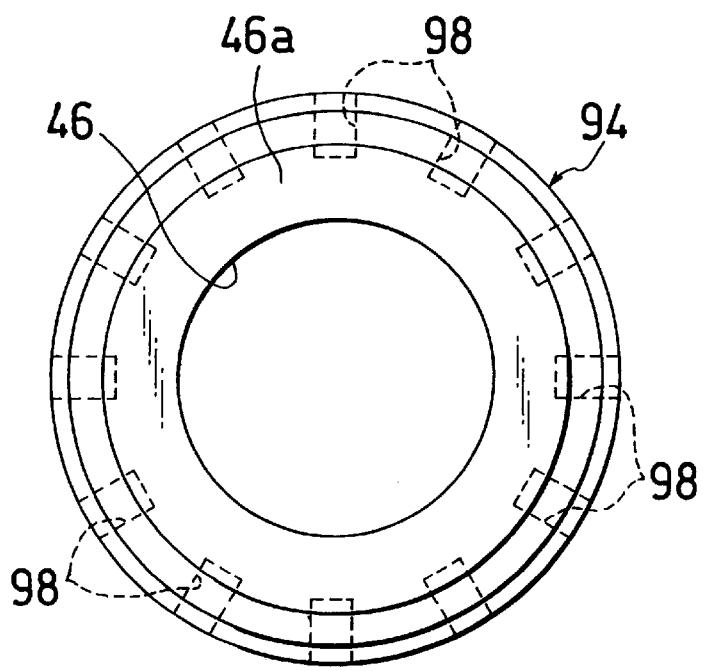
FIG. 18 is a view showing an embodiment of a ring body for use with the tool holder shown in FIG. 16.
Figure 19:
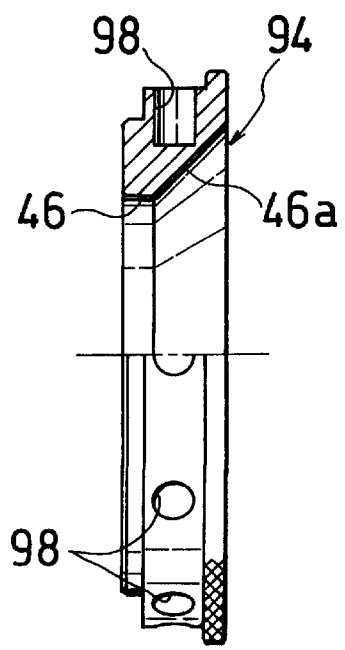
FIG. 19 is a front elevational view partly in section of the ring body shown in FIG. 18.
Figure 20:
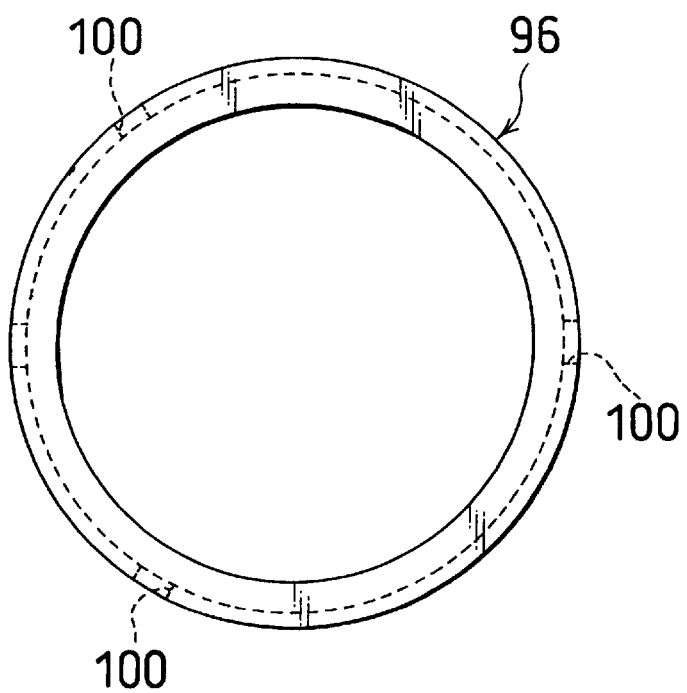
FIG. 20 is a view showing an embodiment of a cover for use with the tool holder shown in FIG. 16.
Figure 21:
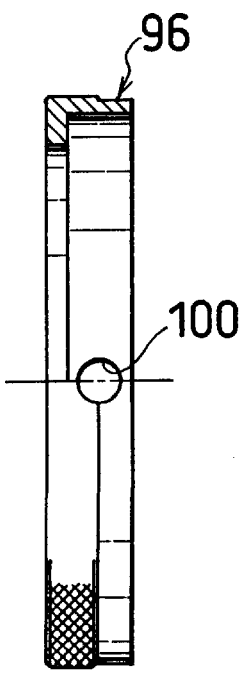
FIG. 21 is a front elevational view partly in section of the cover shown in FIG. 20.

In the tool holder 90, the ring body 94 and the cover 96 are fitted with each other to assemble the ring 92 as shown in FIG. 16. Then, the ring 92 is attached to the holder body 20 from the second section 34 side and is assembled loosely to the flange 36 of the holder body 20 by means of the fastener 24 and the screws 26.

In the condition described above, the ring body 94 and the cover 96 are rotated angularly relative to each other to a position at which a hole 100 of the cover 96 aligns with a predetermined hole 98 in accordance with the direction of the imbalance to be eliminated, and either the balancer 102 in the hole 98 is removed or a predetermined balancer 102 is disposed into the hole 98. Those operations are performed for each hole which a balancer is to be removed from or disposed at.

Disposition and removal of a coil spring 104 into and from a hole 98 may be performed simultaneously with disposition and removal of a balancer 102 into and from the hole 98, or may be performed separately from disposition and removal of a balancer 102 into and from the hole 98.

Then, the ring body 94 and the cover 96 are angularly rotated relative to each other to a position at which the openings 100 of the cover 96 align with some of the holes 98, and then, the ring 92 is assembled tightly to the flange 36 of the holder body 20 by means of the fastener 24 and the screws 26.

The through-holes 50 of the fastener 24 are shouldered holes with recesses having a large diametrical dimension for receiving head portions of the screws 26. Consequently, if the screws 26 are screwed strongly into the ring 92, then the top portions of the screws 26 are accommodated in the through-holes 50 and do not project from the fastener 24.

In a condition where the ring 92 is assembled to the tool holder 90 in such a manner as described above, the ring 92 is pressed at least at the cover 96 thereof by the ring body 94 against the flange 36 so that cancellation of fitting between the ring body 94 and the cover 96 is prevented and the ring body 94 and the cover 96 are prevented from relative rotation. Consequently, there is no possibility that the balancers 102 may come off the holes 98, and the ring 92 is attached stably to the tool holder 90.

When the ring 92 is to be removed from the tool holder 90, the screws 26 should be removed, and then the fastener 24 and the ring 92 should be removed from the second section 34 side.

With the tool holder 90, the ring body 94 can be attached and removed to and from the holder body 90 from the second section 34 side in a condition where the tool holder 90 is attached to a machine, and the balancers 102 can be attached and removed to and from the openings 98 from the outer periphery side of the ring body 94. Consequently, balancing in weight can be performed readily.

While, in the embodiment shown in FIGS. 16 to 21, a ring which does not have imbalance in weight is used, another ring having such an imbalance, particularly, a ring body, may be used.

Figure 22:
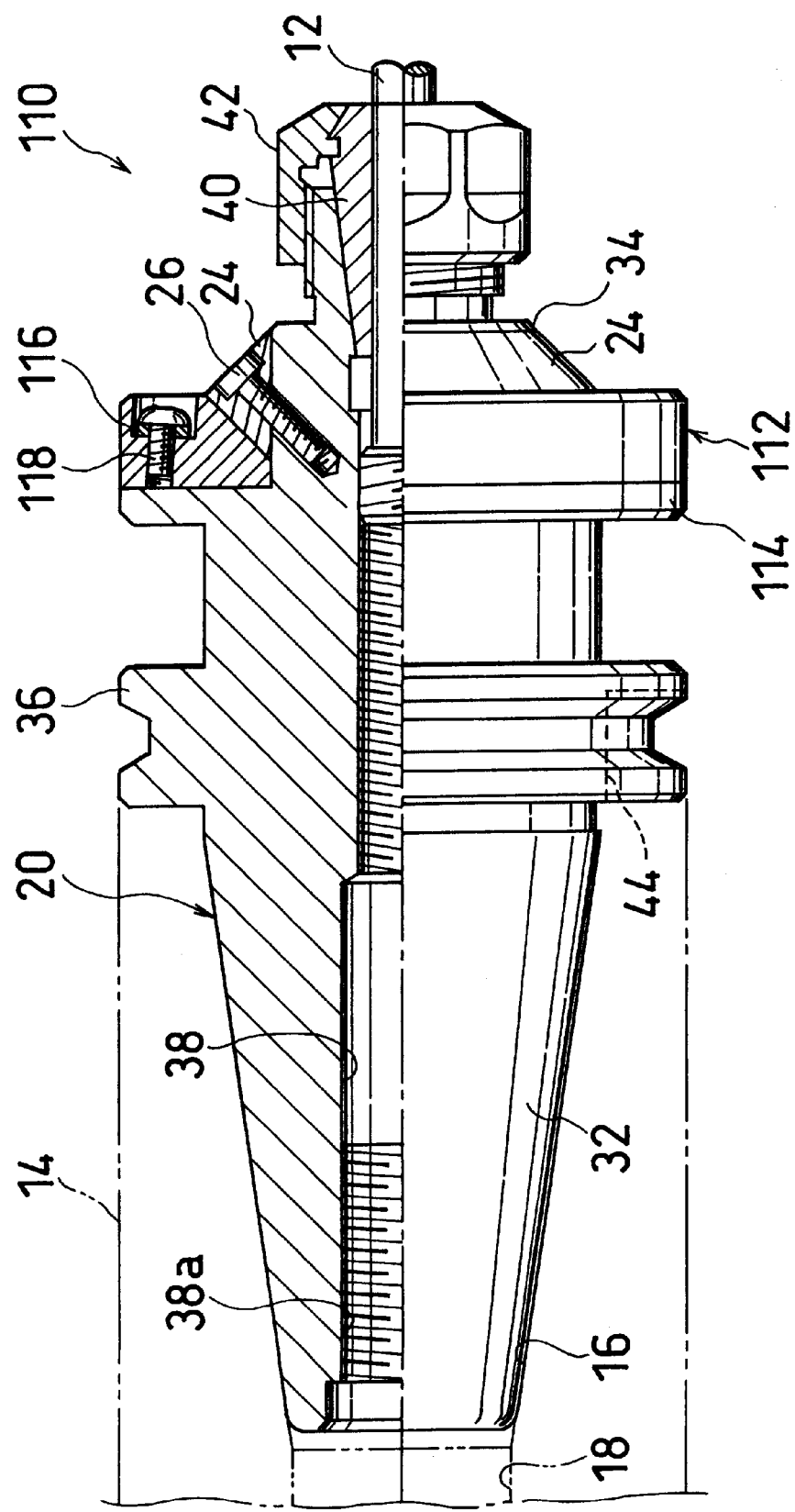
FIG. 22 is a front elevational view partly in section showing a fifth embodiment of a tool holder.
Figure 23:
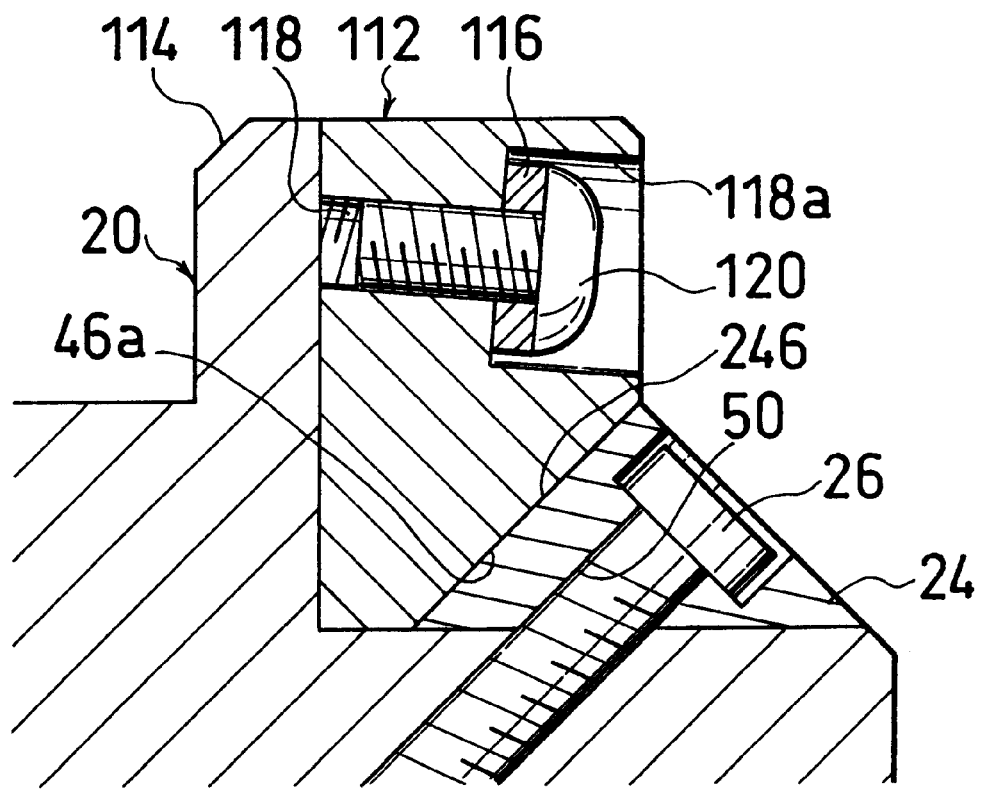
FIG. 23 is an enlarged sectional view of a part of the tool holder shown in FIG. 22.
Figure 24:
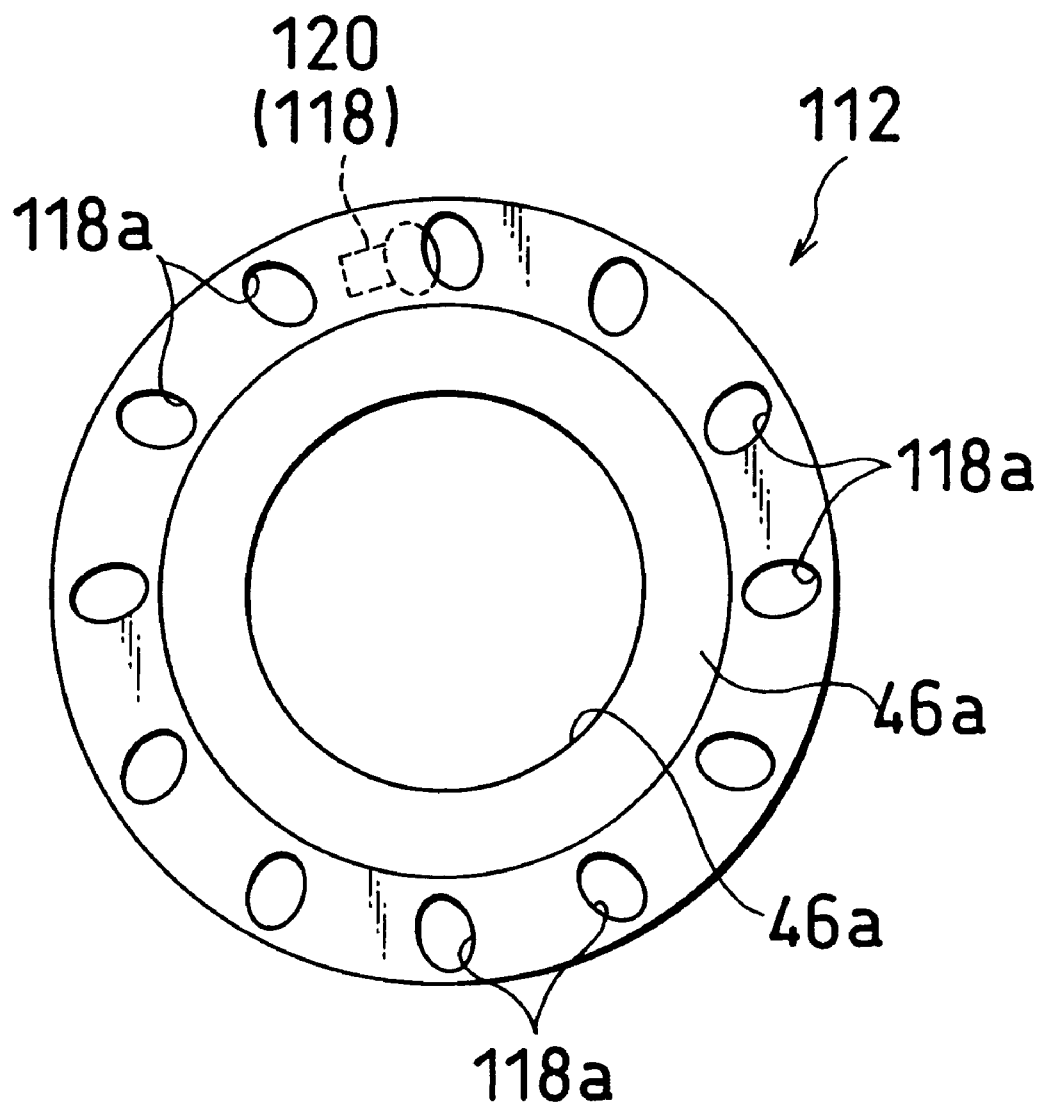
FIG. 24 is a view showing an embodiment of a ring for use with the tool holder shown in FIG. 22.

In a tool holder 110 shown in FIGS. 22 to 24, a ring 112 is assembled to a flange 114 formed adjacent to the second section 34 with respect to the flange 36 for gripping by means of the fastener 24 and screws 26, and a balancer 116 in the form of a ring is arranged in one of threaded holes 118 of the ring 112.

Figure 4:
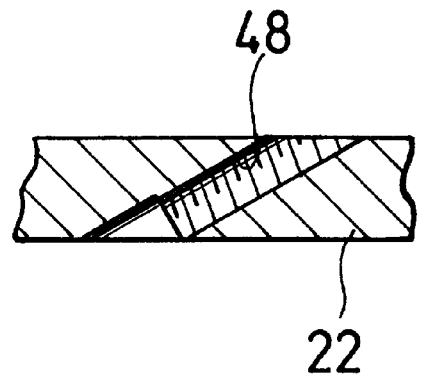
FIG. 4 is a sectional view taken along line 4–4 of FIG. 2.

In the example shown, each of the threaded holes 118 of the ring 112 is part of a shouldered hole which extends in an axial direction of the ring 112 while an axis thereof has an angle with respect to an imaginary line which passes the axis of the holder body 20 and the center in a longitudinal direction of the threaded hole 118 for the balancer so that a portion thereof adjacent to the first section 32 may not be inwardly in a radial direction of the ring 112 with respect to another portion thereof adjacent to the second section, similarly to the holes 48 shown in FIGS. 2 and 4.

The balancer 116 is assembled to the ring 112 by means of a screw 120 screwed into the threaded hole 118, and is positioned in a stepped portion 118a of the threaded hole 118 together with a top portion of the screw 120.

Where the balancer 116 in the form of a ring is used, since it is possible to prepare many kinds of balancers having different weights from one another and select, from among them, a member in accordance with an amount of imbalance to be eliminated, balancing in weight can be performed finely and readily over a wide range when compared with another case where a screw is used as a balancer.

The present invention is not limited to the embodiments described above. For example, threaded holes for balancers may be formed such that portions thereof adjacent to a flange may be inward in radial directions. Further, in place of disposing a ring exchangeably on a holder body, a ring may be disposed unexchangeably on a holder member by shrinkage fitting or the like.

What is claimed is:

1. A tool holder comprising;
    a holder body having a first section to be attached to a machine and a second section coaxially extending from said first section, said first section and said second section defining respectively one end and the other end of said holder body,
    a ring for receiving a part of said holder body, and an assembling device for removably assembling said ring to said holder body,
    said holder body further having a contacting portion with which at least a part of said ring is brought into contact, and said at least a part of said ring facing to the one end side.

2. A tool holder according to claim 1, wherein said ring has an outer peripheral face eccentric with respect to an axis of said holder body.

3. A tool holder according to claim 1, wherein said ring has a plurality of holes angularly spaced from each other around an axis of said ring, and each of said hole is opened at least toward the other end side or an outer periphery side of said ring.

4. A tool holder according to claim 3, wherein each of said holes is a threaded hole extending at least in an axial direction of said holder body.

5. A tool holder according to claim 3, wherein each of said holes is a threaded hole extending at least in an axial direction of said holder body and in radial direction of said ring in such a manner as to come outwardly in radial direction of said ring toward the one end side.

6. A tool holder according to claim 3, wherein each of said holes is a threaded hole extending at least in an axial direction of said holder body such that axis thereof has angle with respect to imaginary line passing the axis of said holder body and the center in a longitudinal direction of said hole so that portion thereof adjacent to the one end may not come inwardly in a radial direction of said ring with respect to portion thereof adjacent to the other end.

7. A tool holder according to claim 3, further comprising at least one of balancing screws screwed into said hole.

8. A tool holder according to claim 5, further comprising at least one of balancers assembled to said ring by means of screw screwed into said threaded hole.

9. A tool holder according to claim 1, wherein said ring includes a ring body having a plurality of holes opening in an outer face thereof and angularly spaced from each other in a circumferential direction, and a ring-shaped cover for receiving said ring body so as to close said holes so that they may be opened.

10. A tool holder according to claim 9, wherein said cover has one or more openings, and are selectively positioned at a position at which at least one of said holes is opened by said opening and another position at which said openings are closed, by angularly rotating said ring body and said cover relative to each other.

11. A tool holder according to claim 1, wherein said ring has a circular through-hole through which said holder body extends and which has an inner face area whose diametrical dimension decreases toward the one end side, and said assembling device includes a fastener disposed between an outer face of said holder body and said inner face area of said ring and having an outer face area fit for said inner face area of said ring body, and a plurality of screws for removably attaching said fastener to said holder body.

12. A tool holder according to claim 11, wherein said screw extends through said fastener and is screwed into said holder body such that the axis thereof approaches the axis of said holder body toward the one end side.

13. A tool holder according to claim 1, wherein said holder body further has a flange formed on an outer periphery thereof and defining said contacting portion.

14. A tool holder according to claim 13, wherein said flange is a gripping flange to be gripped by an automatic tool exchanging machine.

15. A tool holder according to claim 13, wherein said flange is a contacting flange formed adjacent to the other end with respect to a gripping flange to be gripped by an automatic tool exchanging machine.

16. A tool holder, comprising a holder body having a first section to be attached to a machine and a second section coaxially extending from said first section, a ring in which part of said holder body is received and which has a plurality of holes opened in an outer circumferential face thereof and angularly spaced from each other in a circumferential direction, a ring-shaped cover for receiving said ring so as to close said holes so that they may be opened, and an assembling device for removably assembling said ring to said holder body.

17. A tool holder comprising a holder body having a first section to be attached to a machine and a second section coaxially extending from said first section, and a ring unexchangeably disposed on said holder body, said first section and said second section defining respectively one end and the other end of said holder body, said ring having a plurality of holes spaced angularly from each other around an axis of said holder body, and each of said holes being opened at least toward the other end side or an outer periphery side of said ring and extending at least in an axial direction of said holder body and outwardly in radial direction of said ring in such a manner as to come outwardly in the radial direction of said ring toward the one end.

18. A tool holder comprising a holder body having a first section to be attached to a machine and a second section coaxially extending from said first section, and a ring unexchangeably disposed on said holder body, said first section and said second section defining respectively one end and the other end of said holder body, said ring having a plurality of holes spaced angularly from each other around an axis of said holder body, and each of said holes opened at least toward the other end side or an outer periphery side of said ring and extending at least in an axial direction of said ring such that the axis thereof has angle with respect to an imaginary line passing the axis of said holder body and the center in the longitudinal direction of said hole so that a portion thereof adjacent to said first section may not come inwardly in radial direction of said ring with respect to a portion thereof adjacent to the other end.

* * * * *